F. E. BROWN.
Wheel-Cultivator.
No. 34,732.　　　　　　　　　　　　　　　Patented Mar. 25, 1862.
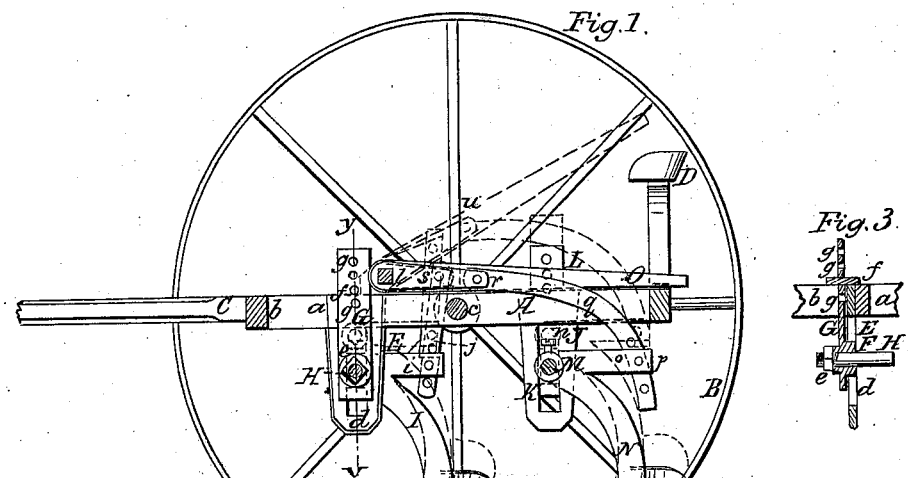
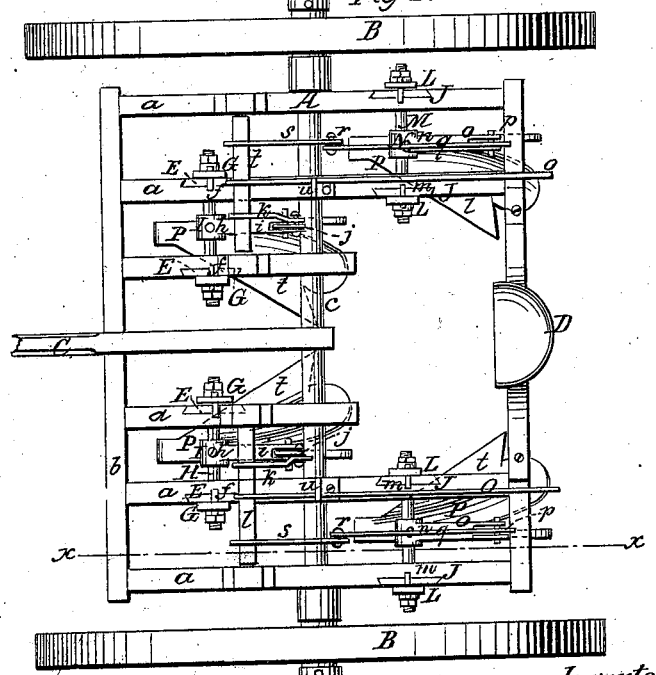
Witnesses:
J. W. Coombs.
Geo. Reed.
Inventor:
Franklin E. Brown
per
Munn & Co.
Attys.

UNITED STATES PATENT OFFICE.

FRANKLIN E. BROWN, OF HIGHTSTOWN, NEW JERSEY.

IMPROVEMENT IN CULTIVATORS.

Specification forming part of Letters Patent No. 34,732, dated March 25, 1862.

*To all whom it may concern:*

Be it known that I, FRANKLIN E. BROWN, of Hightstown, in the county of Mercer and State of New Jersey, have invented a new and Improved Plow for Cultivating Crops in Hills or Drills; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a plan or top view of the same; Fig. 3, a section of a portion of the same, taken in the line $y\,y$, Fig. 1.

Similar letters of reference indicate corresponding parts in the several figures.

This invention relates to an improved plow for cultivating those crops which are grown in hills or drills—such as corn, potatoes, and the like; and it consists in a novel manner of attaching a series or gang of plows to a mounted frame, as hereinafter fully shown and described, whereby the plows are allowed to rise and fall to correspond to the irregularities or undulations of the surface of the ground, and at the same time rendered capable of being readily raised, when not required for use, above the surface of the ground, and also rendered capable of being adjusted at a greater or less distance apart, as well as being adjusted higher or lower to penetrate the ground to the required depth.

To enable those skilled in the art to fully understand and construct my invention, I will proceed to describe it.

A represents a rectangular frame, which is mounted on two wheels, B B, and has a draft-pole, C, attached. At the back part of the frame A the driver's seat D is placed. The frame A is provided with a series of longitudinal bars, $a$, the front ends of which are framed in the front cross-piece, $b$, of the frame A, the back parts of two of said bars resting on the axle $c$, and the other four extending back to the back cross-piece of the frame A, the axle passing through the bars $a$. The axle $c$ is stationary, the wheels B B turning loosely on them.

To the front part of each longitudinal bar $a$ of the frame A there is attached a pendent bar, E. These bars are slotted vertically, as shown at $d$, and in each slot $d$ there is placed a slide, F, to the outer sides of which vertical plates G are secured, one to each side. The slides F are connected in pairs by horizontal rods H, which pass through their centers and also through the plates G, and have screw-nuts $e$ on their outer ends. The rods H are allowed to turn in the slides F and plates G, and the latter are suspended from the bars $a$ of the frame A by pins $f$, which pass through the plates and rest on the bars $a$, a series of holes, $g$, being made in the plates G, one over the other, through any of which the pins $f$ may pass.

On each rod H there is secured a plow-standard, I, by a set-screw, $h$, and each standard has an arm, $i$, projecting from it. The outer ends of these arms are connected by links $j$ to arms $k$, the front ends of which are fitted loosely on square shafts $l\,l$, which have their bearings on the frame A.

To the back parts of the four longer bars $a$ there are attached pendent bars J, one to each. These bars J are slotted precisely like the bars E, and are provided with slides K, having vertical plates L attached, the latter being suspended from their bars $a$ by pins $m$ in precisely the same way as the plates G.

The slides K of the plates J are connected in pairs by rods M in the same way as the rods H connect the slides F, and on each rod M a plow-standard, N, is secured by a set-screw, $n$. The upper ends of the standards N have each an arm, $o$, projecting from it, and the outer ends of these arms $o$ are connected by pins $p$ to the back parts of arms $q$, which have their front ends connected by pivots $r$ to arms $s$, the front ends of which are fitted loosely on the shafts $l\,l$. To each shaft $l$ there is fitted a lever, O.

The standards I N have plows P at their lower ends. These plows have a mold-board, $t$, at one side only, and arranged so as to throw the earth toward the center of the machine. (See Fig. 2.)

From the above description it will be seen that as the implement or machine is drawn along the plows P may at any time be raised up free from the ground by raising the levers O, the latter being within reach of the driver on seat D; and it will also be seen that in consequence of the rods H M, to which the plow-standards I N are attached, being fitted in or passing through the slides F K the plows are allowed a certain degree of vertical play independently of the frame A, and consequently will conform to the irregularities of the surface of the ground.

The plow-standards I N may be adjusted laterally on the rods H M, and as the arms k s are fitted loosely on the square shafts l l, it will be seen that the plows P may be readily placed nearer to or farther from each other, as circumstances may require.

I would remark that there are two notched uprights, u u, on the frame A to support the levers O O when elevated.

I do not claim any part of the invention patented by Early and Parvin, December 10, 1861.

Having thus described my invention, what I claim as new, and desire to secure by Letters Patent, is—

1. The combination of the adjustable slides F, plates G, slotted pendants E, and connecting-rod H with each other and with the standard I, in the manner herein shown and described.

2. The arrangement of the pendent slotted bars E J, slides F K, plates G L, rods H M, standards I N, and arms i o with each other and with the arms q, links j, arms s, shafts l, and lever O, as and for the purpose herein shown and described.

FRANKLIN E. BROWN.

Witnesses:
 JOSEPH WOOD,
 WILLIAM E. BROWN.